United States Patent
Wu et al.

(10) Patent No.: US 10,067,790 B2
(45) Date of Patent: Sep. 4, 2018

(54) METHOD AND APPARATUS FOR DISPLAYING INFORMATION TO A USER AND THE USER OPTIMIZING RUNNING OF THE PROCESSES

(71) Applicant: Beijing Qihoo Technology Company Limited, Beijing (CN)

(72) Inventors: Yuanguo Wu, Beijing (CN); Liang Wu, Beijing (CN); Xiaobin Zong, Beijing (CN); Huan Ren, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 14/786,418

(22) PCT Filed: Jan. 24, 2014

(86) PCT No.: PCT/CN2014/071417
§ 371 (c)(1),
(2) Date: Oct. 22, 2015

(87) PCT Pub. No.: WO2014/173194
PCT Pub. Date: Oct. 30, 2014

(65) Prior Publication Data
US 2016/0077876 A1    Mar. 17, 2016

(30) Foreign Application Priority Data
Apr. 23, 2013    (CN) .......................... 2013 1 0144296

(51) Int. Cl.
*G06F 9/50*    (2006.01)

(52) U.S. Cl.
CPC ..................................... *G06F 9/50* (2013.01)

(58) Field of Classification Search
None
See application file for complete search history.

(56) References Cited

U.S. PATENT DOCUMENTS 5,781,703 A * 7/1998 Desai .................. G06F 11/3495
706/50
7,636,918 B2 * 12/2009 Kadashevich ...... G06F 11/3466
709/223

(Continued)

FOREIGN PATENT DOCUMENTS

| CN | 102073545 A | 5/2011 |
|---|---|---|
| CN | 102968335 A | 3/2013 |
| WO | WO 2012/160384 | 11/2012 |

OTHER PUBLICATIONS

Banerjee, Amit. "What Makes Google Chrome Different From Firefox and IE" Oct. 23, 2012. http://www.ampercent.com/what-makes-google-chrome-different-from-firefox-and-ie/28/.*

(Continued)

*Primary Examiner* — Benjamin C Wu
*Assistant Examiner* — Michael W Ayers
(74) *Attorney, Agent, or Firm* — Alston & Bird LLP

(57) ABSTRACT

The invention discloses a method and apparatus for optimizing the running of a browser. The method comprises: obtaining information of browser processes at the browser side and their first resource occupation information; obtaining information of currently running processes of a computer system where the browser is located and their second resource occupation information through a browser interface; loading and displaying information of at least a part of processes which meet a preset resource occupation optimization setting in the obtained information of the browser processes and information of the currently running processes of the computer system where the browser is located and/or their resource occupation information at the browser side; and according to an optimization instruction triggered by a user, performing process optimization processing to the displayed at least a part of processes. By the invention, resource occupation situations of all processes to be opti- (Continued)

mized can be presented to a user, thereby facilitating the selection of the process optimization processing by the user, and then the optimization processing is performed to the process selected by the user, to increase the running speed of the browser.

20 Claims, 8 Drawing Sheets

(56) References Cited

U.S. PATENT DOCUMENTS

| | | | |
|---|---|---|---|
| 8,051,166 B1 | 11/2011 | Baumback et al. | |
| 9,098,333 B1* | 8/2015 | Obrecht | G06F 9/50 |
| 2004/0267548 A1* | 12/2004 | Jones | G06F 11/3409 |
| | | | 705/34 |
| 2011/0088039 A1* | 4/2011 | Tabone | G06F 17/30097 |
| | | | 718/104 |
| 2011/0296416 A1* | 12/2011 | Kim | G06F 11/328 |
| | | | 718/100 |
| 2013/0232506 A1* | 9/2013 | Mazzoni | G06F 9/542 |
| | | | 719/313 |
| 2013/0332936 A1* | 12/2013 | Magee | G06F 9/50 |
| | | | 718/104 |

OTHER PUBLICATIONS

Saxena, Hemant. "Find & Disable Power-Hungry Extensions in Chrome using Chrome Task Manager". The Windows Club. Oct. 24, 2013. http://www.thewindowsclub.com/chrome-task-manager-disable-extensions.*

International Search Report and Written Opinion of the International Searching Authority for Application No. PCT/CN2014/071417, dated Apr. 30, 2014.

* cited by examiner

| | Resource occupation by 38% | One-key acceleration |

| Close webpage | Resource occupation |
|---|---|
| ☐ 🎨 Browser | Medium |
| ☐ 📄 Tab page: New tab page | Low |
| ☐ 📄 Tab page: Taobao - Tao! I like | Low |
| ☐ 🧩 Tab page: Baidu it, and you'll know | Low |
| ☐ 🧩 Extension program: 360 microblog reminder (enhanced edition) | Medium |
| ☐ 🧩 Extension program: 360 email access | Low |
| ☐ 🧩 Plug-in: 360 top-speed browser microblog plug-in | Low |
| ☐ 🧩 Plug-in: 360 top-speed browser email access | Medium |

Figure 4

70% used

The computer is full of energy
Available memory is sufficient
please continue to maintain.

One-key acceleration

Optimize system resources

🗑 Clean system memory and garbage

Programs/services suggested to be closed

| | | |
|---|---|---|
| 🔲 Cloud drive | 78.7MB | ☐ |
| Intel rapid storage service | 4.5MB | ☑ |
| China network television background service | 3MB | ☑ |
| Graphics interface auxiliary program | 1.8MB | ☑ |
| Mobile phone assistant service | 1.7MB | ☑ |
| Computer expert service | 1.7MB | ☑ |

⚙ Computer acceleration    📊 Check the network speed

Figure 5

METHOD AND APPARATUS FOR DISPLAYING INFORMATION TO A USER AND THE USER OPTIMIZING RUNNING OF THE PROCESSES

FIELD OF THE INVENTION

The invention relates to the field of internet, and in particular, to a method and apparatus for optimizing the running of a browser.

BACKGROUND OF THE INVENTION

Nowadays, in the era of the network being increasingly developed, the browser has become a major tool used by a large number of users in network activities. For example, a user can perform operations such as news browsing, video viewing, file downloading, etc. by a browser. However, with the increasing of the user's online time, the running speed of the browser may become slower and slower. The reason that causes the running speed of the browser becoming slower may be that the software that the user opens becomes more and more, the number of web pages that the browser opens simultaneously is too large, the memory is insufficient, an extension program(s) has/have been loaded, or the like, these will bring serious obstacles to the user's online operations.

Currently, for the problem that the running speed of a browser is slow, it is solved by the following ways: expanding a virtual memory, stopping unnecessary background services through setting options provided by the system, cleaning plug-ins, or the like.

However, in fact, among the reasons that cause the running speed of a browser of a user to become slower, a poor design of the script of a web page and excessive occupation of resources, etc. caused by too many processes being run simultaneously are important reasons that cause the running speed of the browser to become slower, for example, excessive occupation of the CPU (Central Processing Unit) resource and the memory. The processes are too many is mainly caused since web pages and applications opened by the user and extension programs and plug-ins, etc. loaded by the user are excessive.

Yet under present conditions, a browser can not be sped up effectively, resulting that the access to the network is slow.

SUMMARY OF THE INVENTION

In view of the above problems, the invention provides a method and apparatus for optimizing the running of a browser to overcome the above problems or at least partly solve the above problems.

According to an aspect of the invention, there is provided a method for optimizing the running of a browser comprising:

obtaining information of browser processes at the browser side and their first resource occupation information;

obtaining information of currently running processes of a computer system where the browser is located and their second resource occupation information through a browser interface;

loading and displaying information of at least a part of processes which meet a preset resource occupation optimization setting in the obtained information of the browser processes and information of the currently running processes of the computer system where the browser is located and/or their resource occupation information at the browser side; and according to an optimization instruction triggered by a user, performing process optimization processing to the displayed at least a part of processes.

Optionally, before obtaining information of browser processes at the browser side and their first resource occupation information, there is further comprised:

starting a preset work thread of an optimization program at the browser side, wherein the preset work thread is configured to obtain the information of the browser processes at the browser side and the first resource occupation information and obtain the information of the currently running processes of the computer system where the browser is located and their second resource occupation information.

Optionally, the step of obtaining information of browser processes at the browser side and the first resource occupation information comprises:

the optimization program at the browser side sending a request for obtaining the first resource occupation information to the preset work thread;

the preset work thread sending a request for obtaining the information of the browser processes to a preset plug-in process at the browser side;

the preset plug-in process obtaining the information of the browser processes by a browser main program communicating with an extension module of the optimization program at the browser side;

the preset plug-in process returning the information of the browser processes to the preset work thread; and the preset work thread obtaining the first resource occupation information by calculating according to the information of the browser processes.

Optionally, the step of obtaining information of currently running processes of a computer system where the browser is located and their second resource occupation information through a browser interface comprises:

the preset work thread obtaining the information of the currently running processes of the computer system where the browser is located and their second resource occupation information through the browser interface.

Optionally, before starting a preset work thread of an optimization program at the browser side, there is further comprised:

the browser is started, wherein a browser main program and the optimization program of the browser are at least comprised when the browser is started.

Optionally, the information of the browser processes at least comprises: information of a web page label sub-process or thread, information of a browser plug-in process, and information of a browser extension process.

Optionally, when the information of the browser processes is information of a web page label sub-process or thread, the information of the browser processes comprises at least one of the following items:

an identification number of the label or thread, a title of the label or thread, an address of the label or thread, an icon of the label or thread, a message of a browser sub-process where the label or thread is located, a CPU occupancy rate of the label or thread, a memory occupancy amount of the label or thread, and an occupancy level separately corresponding to the label or thread;

when the information of the browser processes is information of a plug-in process, the information of the browser processes comprises at least one of the following items:

an icon of the plug-in process, a name of the plug-in process, bandwidth occupation of the plug-in process, to FPS (Fast Package Schedule) value of the plug-in process, a CPU occupancy rate of the plug-in process, a memory occupancy amount of the plug-in process, and an occupancy level separately corresponding to the plug-in process; and when the information of the browser processes is information of an extension process, the information of the browser processes at least comprises one of the following items:

an icon of the extension process, a name of the extension process, bandwidth occupation of the extension process, a FPS value of the extension process, a CPU occupancy rate of the extension process, a memory occupancy amount of the extension process, and an occupancy level separately corresponding to the extension process.

Optionally, the information of currently running processes of the computer system where the browser is located comprises at least one of the following items: a CPU occupancy rate of the process, a input/output port occupancy amount of the process, a memory occupancy amount of the process, a module description of the process, a network throughput, and an occupancy level separately corresponding to the process.

Optionally, the first resource occupation information is obtained by calculating according to the CPU occupancy rate of the browser process and/or the memory occupancy amount of the browser process;

the second resource occupation information is obtained by calculating according to at least one piece of the following information: the CPU occupancy rate, the memory occupancy amount, the input/output port occupancy amount, and the network throughput of the currently running process of the computer system where the browser is located.

Optionally, for the browser process, a judgment condition of the preset resource occupation optimization setting is:

judging whether the numeric value of the first resource occupation information of the browser process exceeds a preset first threshold, and if it exceeds the first threshold, determining that the browser process meets the preset resource occupation optimization setting.

Optionally, for a currently running process of the computer system where the browser is located, the preset resource occupation optimization setting comprises a first optimization setting and a second optimization setting;

a judgment condition of the first optimization setting comprises one or more of the following:

judging whether the numeric value of the second resource occupation information of the currently running process of the computer system where the browser is located exceeds a preset second threshold, and if it exceeds the second threshold, determining that the currently running process of the computer system where the browser is located meets the first optimization setting;

according to the information of the process, judging whether the currently running process of the computer system where the browser is located occurs in foreground running processes, and if it does not occur in the foreground running processes, determining that the currently running process of the computer system where the browser is located meets the first optimization setting, wherein the foreground running processes comprise a process shown on the taskbar and a process shown on a window;

according to the information on the process, judging whether the currently running process of the computer system where the browser is located meets a preset blacklist rule, and if yes, determining that the currently running process of the computer system where the browser is located meets the first optimization setting;

according to the information on the process, judging whether the currently running process of the computer system where the browser is located meets a preset running condition, and if not, determining that the currently running process of the computer system where the browser is located meets the first optimization setting; and a judgment condition of the second optimization setting is as follows:

when the currently running process of the computer system where the browser is located does not meet the first optimization setting, judging whether an abnormity occurs to the currently running process of the computer system where the browser is located, and if an abnormity occurs, determining that the process meets the second optimization setting, wherein the abnormity comprises a GDI (Graphics Device Interface) leakage, a window crash, and a CPU crash.

Optionally, when a foreground running process is a process shown on a window, the preset resource occupation optimization setting further comprises: when the using frequency of the process shown on the window is lower than a preset value, further judging whether the process is set top in the window, and if the judgment result is no, determining that the process meets the preset resource occupation optimization setting.

Optionally, the optimization processing at least comprises: closing of a web page label sub-process or thread, closing of a browser extension process, closing of a browser plug-in process, closing of a currently running process and/or service of the computer system where the browser is located, freeing of the memory, and cleaning of system garbage;

when an object on which the optimization processing is to be performed is a currently running process of the computer system where the browser is located, the optimization processing further comprises: setting the CPU priority level for the process to be optimized; and/or switching the process to be optimized from multiple cores of a multi-core CPU into one core.

According to another aspect of the invention, there is provided an apparatus for optimizing the running of a browser comprising:

an obtaining module configured to obtain information of browser processes at the browser side and their first resource occupation information;

the obtaining module is further configured to obtain information of currently running processes of a computer system where the browser is located and their second resource occupation information through a browser interface;

a loading & displaying module configured to load and display information of at least a part of processes which meet a preset resource occupation optimization setting in the obtained information of the browser processes and information of the currently running processes of the computer system where the browser is located and/or their resource occupation information at the browser side; and an optimization processing module configured to, according to an optimization instruction triggered by a user, perform process optimization processing to the displayed at least a part of processes.

Optionally, the apparatus further comprises:

a starting module configured to start a preset work thread of an optimization program at the browser side, wherein the preset work thread is configured to obtain the information of the browser processes at the browser side and the first resource occupation information and obtain the information of the currently running processes of the computer system where the browser is located and their second resource occupation information.

Optionally, the obtaining module is further configured to obtain the information of the browser processes at the browser side and their first resource occupation information according to the following steps:

the optimization program at the browser side sending a request for obtaining the first resource occupation information to the preset work thread;

the preset work thread sending a request for obtaining the information of the browser processes to a preset plug-in process at the browser side;

the preset plug-in process obtaining the information of the browser processes by a browser main program communicating with an extension module of the optimization program at the browser side;

the preset plug-in process returning the information of the browser processes to the preset work thread; and the preset work thread obtaining the first resource occupation information by calculating according to the information of the browser processes.

Optionally, the obtaining module is further configured to obtain the information of the currently running processes of the computer system where the browser is located and their second resource occupation information according to the following step:

the preset work thread obtaining the information of the currently running processes of the computer system where the browser is located and their second resource occupation information through the browser interface.

Optionally, the apparatus further comprises:

a starting module configured to start the browser, wherein a browser main program and the optimization program of the browser are at least comprised when the browser is started.

Optionally, the information of the browser processes obtained by the obtaining module at least comprises: information of a web page label sub-process or thread, information of a browser plug-in process, and information of a browser extension process.

Optionally, when the information of the browser processes is information of a web page label sub-process or thread, the information of the browser processes comprises at least one of the following items:

an identification number of the label or thread, a title of the label or thread, an address of the label or thread, an icon of the label or thread, a message of a browser sub-process where the label or thread is located, a CPU occupancy rate of the label or thread, a memory occupancy amount of the label or thread, and an occupancy level separately corresponding to the label or thread;

when the information of the browser processes is information of a plug-in process, the information of the browser processes comprises at least one of the following items:

an icon of the plug-in process, a name of the plug-in process, bandwidth occupation of the plug-in process, a Fast Package Schedule FPS value of the plug-in process, a CPU occupancy rate of the plug-in process, a memory occupancy amount of the plug-in process, and an occupancy level separately corresponding to the plug-in process; and when the information of the browser processes is information of an extension process, the information of the browser processes comprises at least one of the following items:

an icon of the extension process, a name of the extension process, bandwidth occupation of the extension process, a FPS value of the extension process, a CPU occupancy rate of the extension process, a memory occupancy amount of the extension process, and an occupancy level separately corresponding to the extension process.

Optionally, the information of currently running processes of the computer system where the browser is located comprises at least one of the following items: a CPU occupancy rate of the process, a input/output port occupancy amount of the process, a memory occupancy amount of the process, a module description of the process, a network throughput, and an occupancy level separately corresponding to the process.

Optionally, the first resource occupation information obtained by the obtaining module is obtained by calculating according to the CPU occupancy rate of the browser process and/or the memory occupancy amount of the browser process;

the second resource occupation information obtained by the obtaining module is obtained by calculating according to at least one piece of the following information: the CPU occupancy rate, the memory occupancy amount, the input/output port occupancy amount, and the network throughput of the currently running process of the computer system where the browser is located.

Optionally, for the browser process, a judgment condition of the preset resource occupation optimization setting is:

judging whether the numeric value of the first resource occupation information of the browser process exceeds a preset first threshold, and if it exceeds the first threshold, determining that the browser process meets the preset resource occupation optimization setting.

Optionally, for a currently running process of the computer system where the browser is located, the preset resource occupation optimization setting comprises a first optimization setting and a second optimization setting;

a judgment condition of the first optimization setting comprises one or more of the following:

judging whether the numeric value of the second resource occupation information of the currently running process of the computer system where the browser is located exceeds a preset second threshold, and if it exceeds the second threshold, determining that the currently running process of the computer system where the browser is located meets the first optimization setting;

according to the information of the process, judging whether the currently running process of the computer system where the browser is located occurs in foreground running processes, and if it does not occur in the foreground running processes, determining that the currently running process of the computer system where the browser is located meets the first optimization setting, wherein the foreground running processes comprise a process shown on the taskbar and a process shown on a window;

according to the information on the process, judging whether the currently running process of the computer system where the browser is located meets a preset blacklist rule, and if yes, determining that the currently running process of the computer system where the browser is located meets the first optimization setting;

according to the information on the process, judging whether the currently running process of the computer system where the browser is located meets a preset running condition, and if not, determining that the currently running process of the computer system where the browser is located meets the first optimization setting; and a judgment condition of the second optimization setting is as follows:

when the currently running process of the computer system where the browser is located does not meet the first optimization setting, judging whether an abnormity occurs to the currently running process of the computer system where the browser is located, and if an abnormity occurs, determining that the process meets the second optimization setting, wherein the abnormity comprises a GDI (Graphics Device Interface) leakage, a window crash, and a CPU crash.

Optionally, when a foreground running process is a process shown on a window, the preset resource occupation optimization setting further comprises: when the using frequency of the process shown on the window is lower than a preset value, further judging whether the process is set top in the window, and if the judgment result is no, determining that the process meets the preset resource occupation optimization setting.

Optionally, the optimization processing performed by the optimization processing module at least comprises: closing of a web page label sub-process or thread, closing of a browser extension process, closing of a browser plug-in process, closing of a currently running process and/or service of the computer system where the browser is located, freeing of the memory, and cleaning of system garbage;

when an object on which the optimization processing is to be performed is a currently running process of the computer system where the browser is located, the optimization processing further comprises: setting the CPU priority level for the process to be optimized; and/or switching the process to be optimized from multiple cores of a multi-core CPU into one core.

According to yet another aspect of the invention, there is provided a computer program comprising a computer readable code which causes a computing device to perform any of the methods for optimizing the running of a browser described above, when said computer readable code is running on the computing device.

According to still another aspect of the invention, there is provided a computer readable medium storing therein the computer program as described above.

The beneficial effects of the invention lie in that:

Information of resources occupied by processes is gotten by obtaining information of the browser processes and non-browser processes running locally. Subsequently, the obtained information of resources is presented on an interface, which facilitates a user to see the resource occupation of each process conveniently and intuitively and then perform reasonable optimization processing to them.

In the prior art, a poor design of the script of a web page or excessive occupation of resources (CPU, memory, etc.) caused by too many processes being run simultaneously is an important reason that causes the browser to crash or become slower. When confronted with a multitude of processes or web pages, the user can not speed up the browser effectively. The difference between embodiments of the invention and the prior art lies in that resource occupation situations of all processes to be optimized can be presented to the user, and the user can free system resources by performing optimization processing to these processes correspondingly, to accelerate the running speed of the browser.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings:

FIG. 4 schematically shows a schematic diagram of an interface in which an optimization program displays browser processes according to an embodiment of the invention;

FIGS. 5-7 schematically show schematic diagrams of an interface in which an optimization program displays non-browser processes according to an embodiment of the invention;

DETAILED DESCRIPTION OF THE INVENTION

In the following the invention will be further described in connection with the drawings and particular embodiments.

An embodiment of the invention provides a method for optimizing the running of a browser, which carries out optimization processing mainly with respect to currently running processes, thereby accelerating the running speed of the browser. It needs to be noted that currently running processes in embodiments of the invention comprises two categories: browser processes at the browser side and non-browser processes, wherein the non-browser processes are currently running processes (e.g., a process of Word, Fetion, QQ, etc.) of a computer system where the browser is located. The mentioned browser processes at least comprises a main process of the browser, a web page process/sub-process, a browser plug-in process, a browser extension process, etc.

Therein, the optimization method can be implemented by installing an optimization program at the browser side.

Embodiment One

It needs to be noted that, when specifically implemented, the embodiment of the invention can be carried out by an optimization program (e.g., a browser doctor) at the browser side, and before executing the method in embodiment One of the invention, the browser needs to be started first, wherein in the procedure of starting the browser, a browser main program and the optimization program are started simultaneously.

Figure 1:
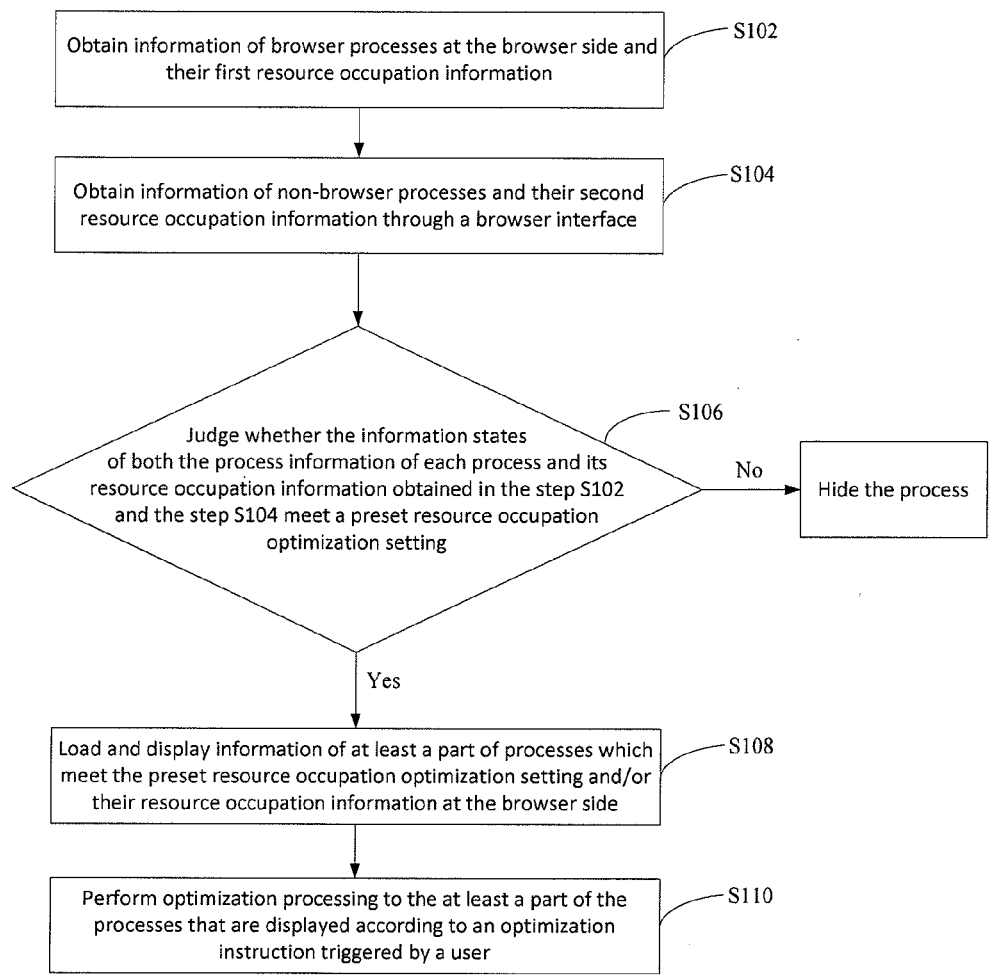
FIG. 1 schematically shows a flow chart of a method for optimizing the running of a browser according to an embodiment of the invention.

After the user clicks the optimization program, a preset work thread of the optimization program is started at the browser side, and afterwards, the optimization method is carried out according to a method in FIG. 1.

FIG. 1 is a flow chart of a method for optimizing the running of a browser in an embodiment of the invention, which comprises steps S102 to S108.

When a user clicks the optimization program, the optimization program executes the step S102 in the method provided by the invention. In the step S102, information of browser processes at the browser side and their first resource occupation information are obtained.

Optionally, the information of the browser processes in the step S102 in this embodiment at least comprises one kind of process information of the following: information of a web page label sub-process or thread, information of a browser plug-in process, and information of a browser extension process.

Figure 2:
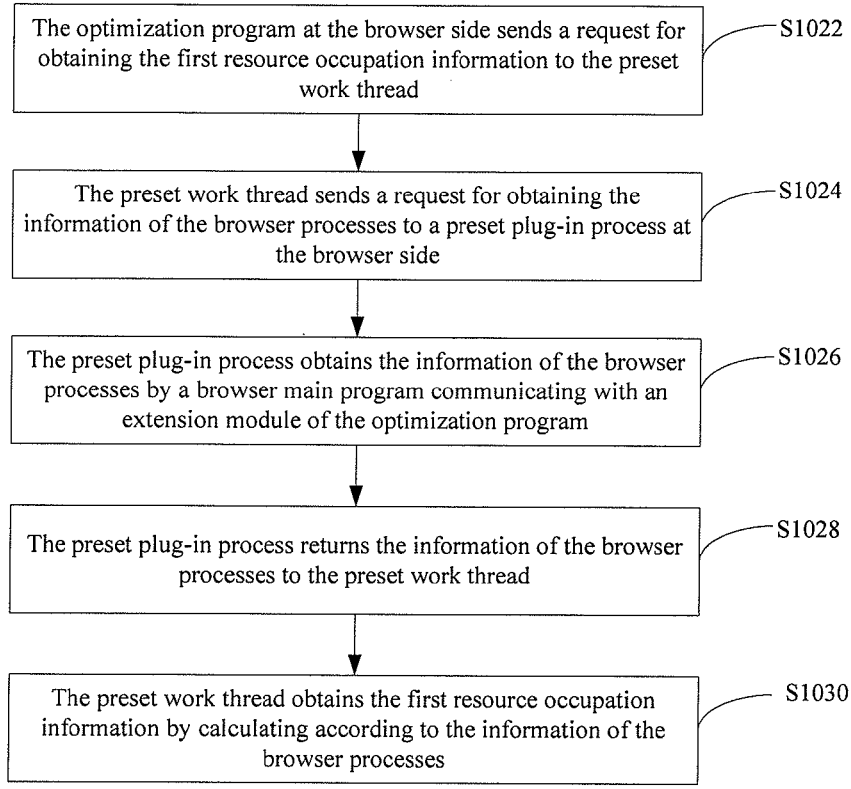
FIG. 2 schematically shows a flow chart of a particular method for obtaining information of browser processes at the browser side and their first resource occupation information according to an embodiment of the invention.

In order to more clearly introduce the specific implementation procedure of the step S102, in the following, a specific approach for obtaining the information of the browser processes at the browser side and their first resource occupation information in the step S102 will be introduced specifically in connection with FIG. 2 provided by an embodiment of the invention, which comprises steps S1022 to S1030.

Firstly, when the user clicks the optimization program, the optimization program executes the step S1022. In the step S1022, the optimization program at the browser side sends a request for obtaining the first resource occupation information to the preset work thread.

Therein, the preset work thread in the step S1022 is loaded with a functional logic module (dll) of the optimization program when started. The functional logic module is used for carrying out the calculation of resource occupation information.

Secondly, after the optimization program executes the step S1022, the preset work thread executes the step S1024. In the step S1024, the preset work thread sends a request for obtaining the information of the browser processes to a preset plug-in process at the browser side.

Optionally, the preset plug-in process is a plug-in process installed at the browser side in advance, and can be an NPAPI plug-in process.

In addition, in this embodiment, when the category of the process information in the step S1024 is different, the specific content contained therein is also different. Optionally, when the process information is information of the web page label sub-process or thread, it comprises at least one of the following items: the identification number (id) of the label or thread, the title of the label or thread, the address (url) of the label or thread, the icon of the label or thread, the message of the browser sub-process where the label or thread is located, the CPU occupancy rate of the label or thread, the memory occupancy amount of the label or thread, and the occupancy level separately corresponding to the label or thread;

when the process information is information of the browser plug-in process, it comprises at least one of the following items: the icon of the plug-in process, the name of the plug-in process, the bandwidth occupation of the plug-in process, the Fast Package Schedule FPS value of the plug-in process, the CPU occupancy rate of the plug-in process, the memory occupancy amount of the plug-in process, and the occupancy level separately corresponding to the plug-in process; and when the process information is information of the browser extension process, it comprises at least one of the following items: the icon of the extension process, the name of the extension process, the bandwidth occupation of the extension process, the FPS value of the extension process, the CPU occupancy rate of the extension process, the memory occupancy amount of the extension process, and the occupancy level separately corresponding to the extension process.

It needs to be noted that, the specific content comprised in the information of the browser processes is just exemplary, and is not limited to the above several items. If a certain piece of specific information is obtained in the procedure of executing the browser process, it can be regarded as the information of the browser processes.

Thirdly, after the preset work thread executes the step S1024, the preset plug-in process proceeds to execute S1026. In the step S1026, the preset plug-in process obtains the information of the browser processes by the browser main program communicating with an extension module of the optimization program.

Therein, the extension module of the optimization program in the step S1026 is started when the optimization program is started, and configured for obtaining the information of the browser processes.

Optionally, the extension module can obtain the information of the browser processes through an interface chrom.experimental.processes provided at the browser side.

Next, after the preset plug-in process obtains the information of the browser processes, it proceeds to execute the step S1028. In the step S1028, the preset plug-in process returns the information of the browser processes to the preset work thread.

Optionally, the preset plug-in process can return the information of the browser processes to the preset work thread asynchronously in a json format.

Lastly, after the preset work thread receives the information of the browser processes, it proceeds to execute the step S1030. In the step S1030, the preset work thread gets the first resource occupation information by calculating according to the information of the browser processes.

Therein, the preset work thread obtains the first resource occupation information of the browser processes by calculating according to one or two of the CPU occupancy rate of the process and the memory occupancy amount of the process in the information of the browser processes.

The steps S1022 to S1030 specifically introduce a specific approach of implementing the step S102. Optionally, after the optimization program executes the step S102, it may proceed to execute the step S104. In the step S104, information of non-browser processes and their second resource occupation information are obtained through a browser interface.

It needs to be noted that, since the step S102 and the step S104 both are operations of obtaining process information of a process and resource occupation information thereof performed by the optimization program, optionally, there may not be a sequential order for the execution of the step S102 and the step S104, that is, the step S104 can be executed before the step S102, or be executed simultaneously with the step S102.

Therein, the information obtained in the step S104 comprises two parts, the obtained information of non-browser processes and the obtained second resource occupation information of the non-browser processes. Now, specific ways of obtaining the two parts of the information will be described respectively.

(1) Information of the Non-Browser Processes

In the embodiment of the invention, the information of the non-browser processes can be obtained by the preset work thread directly through the browser interface.

Optionally, in this embodiment, the information of the non-browser process as described in the step S104 comprises at least one of the following items: the CPU occupancy rate of the process, the input/output port occupancy amount of the process, the memory occupancy amount of the process, the module description of the process, the network throughput, and the occupancy level separately corresponding to the process. The information of the non-browser processes provided herein is just exemplary, and is not limited to the above several items. If a certain piece of specific information is obtained in the procedure of executing a non-browser process, it can be regarded as the information of the non-browser processes.

(2) Second Resource Occupation Information of the Non-Browser Processes

In the embodiment of the invention, the second resource occupation information of the non-browser processes is obtained by the preset work thread by calculating according to at least one of the following items: the CPU occupancy rate, the memory occupancy amount, the input/output port occupancy amount, and the network throughput of the process.

After the optimization program respectively obtains the information of the browser processes and their first resource occupation information, the information of the non-browser processes and their second resource occupation information by the step S102 and the step S104, the optimization program further proceeds to execute the step S106. In the step S106, it is judged whether the information states of both the process information and the resource occupation information of each process obtained in the step S102 and the step S104 meet a preset resource occupation optimization setting.

When the information states of both the process information and the resource occupation information of a process meet the preset resource occupation optimization setting, the following step S108 is further executed. Otherwise, it shows that the process does not need optimization processing, and at this point the process is hidden.

Therein, for the browser process and the non-browser process in the step S106, when judging whether the information states of both their process information and their resource occupation information meet the preset resource occupation optimization setting, different judgment approaches are adopted. In the following, approaches for judging whether a browser process and a non-browser process meet the preset resource occupation optimization setting will be introduced in detail.

(1) For a browser process, a judgment condition of the preset resource occupation optimization setting is as follows:

It is judged whether the numeric value of the first resource occupation information of the browser process exceeds a preset first threshold, and if it exceeds the first threshold, it is determined that the browser process meets the preset resource occupation optimization setting. Otherwise, the process does not meet the preset resource occupation optimization setting. At this point, it shows that the process probably does not need to be optimized, and therefore, it may not be displayed to reduce the workload when the user needs to select.

In the following, that the first resource occupation information is obtained by calculating only according to the memory occupancy amount of a process is taken as an example to illustrate a specific way of evaluating the first threshold.

a) For a host computer with a large memory (e.g., a memory ≥3G), if the memory of the host computer is totally occupied over 70% in the current state, at this point, the first threshold can be set to be 64M, that is, a process of which the memory occupancy amount exceeds 64M is determined as a process which meets the preset resource occupation optimization setting. If the memory of the host computer is totally occupied over 50% and less than 70% in the current state, at this point, the first threshold can be set to be 128M, that is, a process of which the memory occupancy amount exceeds 128M is determined as a process which meets the preset resource occupation optimization setting.

b) And yet for a host computer with a small memory (e.g., a memory <3G), if the memory of the host computer is totally occupied over 70% in the current state, at this point, the first threshold can be set to be 32M, that is, a process of which the memory occupancy amount exceeds 32M is determined as a process which meets the preset resource occupation optimization setting. If the memory of the host computer is totally occupied over 50% and less than 70% in the current state, at this point, the first threshold can be set to be 64M, that is, a process of which the memory occupancy amount exceeds 64M is determined as a process which meets the preset resource occupation optimization setting.

It can be seen that the smaller the total memory of a host computer is and the smaller the remaining memory of the system is, the lower the first threshold is set to be; otherwise, the higher the first threshold is set to be.

Additionally, the first resource occupation information can also be obtained by calculating according to the CPU occupancy rate of the process and the memory occupancy amount of the process, and at this point, the first threshold can be set according to the current CPU occupancy rate, the size of the memory and its using condition of the host computer and in combination with the CPU occupancy rate of the process and the memory occupancy amount of the process.

In brief, for a browser process, it can be judged whether the browser process meets the preset resource occupation optimization setting just by the first resource occupation information. The main purpose of the judgment condition is to find out the browser process which occupies excessive resources and optimize it so as to reduce the resource occupancy rate. Therein, when determining the process which occupies excessive resources, it can be determined dynamically according to the total size of system resources and the total occupancy rate of system resources in the current state. Optionally, when it is judged that a browser process meets the preset resource occupation optimization setting, all the processes that meet the preset resource occupation optimization setting are shown in an order of size of their first resource occupation information, in order for the user to intuitively learn about the resource occupation situation of each process and then perform optimization processing thereon.

(2) For a non-browser process, the preset resource occupation optimization setting comprises a first optimization setting and a second optimization setting. There is at least one judgment condition for each optimization setting. To more clearly elucidate the method provided by the invention, a judgment condition of each optimization setting is now described.

First, a judgment condition of the first optimization setting is introduced. In the embodiment of the invention, the judgment condition may comprise at least one of the following multiple conditions.

Condition One: judging whether the numeric value of the second resource occupation information of the non-browser process exceeds a preset second threshold, and if it exceeds the second threshold, determining that the non-browser process meets the first optimization setting.

For condition One, a specific way of evaluating the second threshold can be referred to the way of evaluating the first threshold, and will not be repeated here.

Condition Two: according to the information of the process, judging whether the non-browser process occurs in foreground running processes, and if it does not occur in the foreground running processes, determining that the non-browser process meets the first optimization setting, wherein the foreground running processes comprise processes shown on the taskbar and processes shown on a window.

The reason why condition Two is set lies in that, in general, if a currently running non-browser process does not occur in the foreground running processes, it means that the non-browser process is not used by the user at present and therefore the non-browser process is probably a process that does not need to be run.

In particular, when a foreground non-browser process is a process shown on a window, the preset resource occupation optimization setting further comprises: when the using frequency of the non-browser process shown on the window is lower than a preset value, further judging whether the non-browser process is set top in the window, and if the judgment result is no, determining that the non-browser process meets the preset resource occupation optimization setting.

Condition Three: according to the information of the process, judging whether the non-browser process meets a preset blacklist rule, and if yes, determining that the non-browser process meets the first optimization setting.

Therein, before the judgment of condition Three, the blacklist rule is preset, and when the process meets the preset blacklist rule, it is determined that the non-browser process meets the first optimization setting. In particular, the blacklist rule is mainly used to define a rule about some processes that the user does not want to open. For example, some processes will pop up ad windows automatically, and these automatically popup ad windows are usually not what the user wants to see, and therefore cause an unnecessary disturbance to the user. Therefore, a rule that a common ad window satisfies can be set in the blacklist rule, for example, features such as the size, title and attribute, etc. of the window, and when a popup window satisfies these features, the window can be determined as an ad window, and thereby a process corresponding to it is judged to meet the first optimization setting.

Condition Four: according to the information of the process, judging whether the non-browser process meets a preset running condition, and if not, determining that the non-browser process meets the first optimization setting.

Therein, when running, some processes must meet a certain running condition, so as to be able to run normally. If the running condition is not met, the process can not be used normally even if it is in a running state. For such a process that can not be used normally since the running condition is not met, it can be optimized (for example, closed). For example, there is an interdependent relation between some processes, for instance, a process A must depend on a process B so as to be able to run. Therefore, when it is detected that the process A is running, it can be further detected whether the process B is running or not, and if the detection result is no, it can be determined that the running condition of the process A is not met, and thereby the optimization processing is performed on it.

Further, a judgment condition of the second optimization setting will be described. Moreover, generally, when a non-browser process does not meet the first optimization setting, a judgment about the second optimization setting is performed to it.

Preferably, a judgment condition of the second optimization setting can be as follows: when the non-browser process does not meet the first optimization setting, judging whether an abnormity occurs to the non-browser process, and if an abnormity occurs, determining that the process meets the second optimization setting, wherein the abnormity comprises a GDI leakage, a window crash, and a CPU crash.

The aim to set the second optimization setting is as follows. When an abnormal non-browser process exists in a system, it will affect the running speed of the browser, and may result in that the browser is stuck and crashes in a severe case. Therefore, when a non-browser process does not meet the condition of the first optimization setting, it continues to be judged whether an abnormity occurs to it, and as such, it can be avoided that any non-browser process that can cause the running speed of the browser to be low is missed out.

Accordingly, when it is judged in the step S106 that the information states of both the process information of a process and its resource occupation information meet the preset resource occupation optimization setting, the step S108 is executed. In the step S108, the information of at least a part of processes which meet the preset resource occupation optimization setting and/or their resource occupation information are loaded and displayed at the browser side. The implementation of the step S108 is helpful for the user to view a process to which the optimization processing may be performed currently and perform the optimization processing to it.

Figure 3:
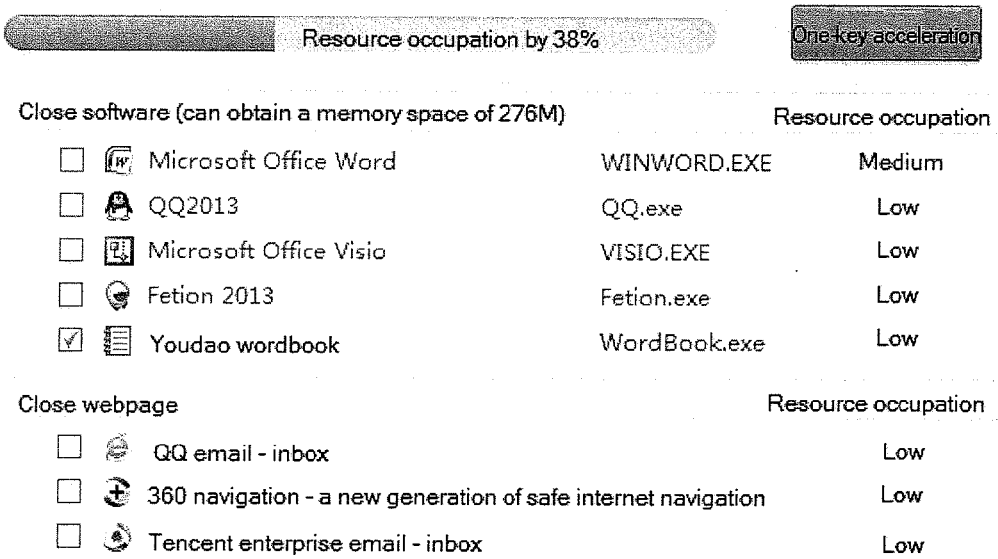
FIG. 3 schematically shows a schematic diagram of a page in which an optimization program displays processes to be optimized according to an embodiment of the invention.

It needs to be noted that, in order to facilitate the user to view the resource occupation situation of each process, the embodiment further presents by FIG. 3 to the user a schematic diagram of a page in which the optimization program displays processes to be optimized. As shown in FIG. 3, the first and the second resource occupation information can be displayed in a page of the optimization program in the form of "low", "medium" and "high", such that the user can more intuitively learn about the resource occupation situation of each process. In addition, in order to facilitate the user to make a difference, browser processes and non-browser processes are displayed in two areas respectively. As shown in FIG. 3, the browser processes to be optimized are displayed in a "close web page" area in FIG. 3, and the non-browser processes to be optimized are displayed in a "close software" area in FIG. 3, to facilitate the user to differentiate the category to which a process belongs.

Additionally, the embodiment further provides FIG. 4, which further shows the user a schematic diagram of an interface in which the optimization program displays browser processes. FIG. 4 specifically displays the information of the browser processes by category, that is, shows the user the total resource occupation situation of the browser processes, and further shows the user the information of web page label sub-processes or threads, information of browser plug-in processes and information of browser extension processes involved in the step S102, which facilitates the user to learn about the categories and resource occupation situations of current browser processes and is helpful for the user to perform the process optimization processing.

After the optimization program displays the information of the processes which meet the preset resource occupation optimization setting and/or their resource occupation information, the optimization processing can be performed to the processes to be optimized by the following step S110. In the step S110, the optimization processing is performed to at least a part of the processes that are displayed according to an optimization instruction triggered by the user.

Optionally, in this embodiment, the user can trigger the optimization instruction by checking an option box ahead of the information of a process in FIG. 3 and clicking the "one-key acceleration" button in the interface of the optimization program. When the user clicks the "one-key acceleration" button, the optimization program forms the processes that meet the optimization setting into a list of tasks to be cleaned and sends it to the preset work thread of the optimization program. After receiving the list of tasks, the preset work thread cleans the processes that meet the optimization setting according to the list of tasks.

Therein, the optimization processing involved in the step S110 comprises at least one of the following: closing of a web page label sub-process or thread, closing of a browser extension process, closing of a browser plug-in process, closing of a non-browser process and/or service, freeing of the memory, and cleaning of system garbage.

In the following, optimization processing procedures of different processes involved in the step S110 will be introduced specifically.

(1) An optimization processing operation of a browser process specifically comprises what is described in items a) and b).

a) When the optimization processing is a close operation of a browser web page label sub-process or thread, the optimization program closes the browser web page label or thread through a standard interface of closing a label provided at the browser side.

b) When the optimization processing is a close operation of a browser extension process, the optimization program closes the extension process through an extension management interface chrome.management.setEnabled provided at the browser side.

(2) An optimization processing operation of a non-browser process comprises the following item c).

c) When the optimization processing is a close operation of a non-browser process/service, the optimization program closes the non-browser process/service by invoking an interface TerminateProcess.

It needs to be noted that, a specific procedure of the optimization operation of a non-browser process in this embodiment will be introduced in detail in embodiment Two.

The embodiment of the invention provides a method for optimizing the running of a browser. Information of resources occupied by processes is obtained by obtaining information of browser processes and non-browser processes running locally. Subsequently, the obtained information of the resources is presented on an interface, which can facilitate a user to see the resource occupation of each process conveniently and intuitively and perform reasonable optimization processing to it.

In the prior art, a poor design of the script of a web page or excessive occupation of resources (CPU, memory, etc.) caused by too many processes being run simultaneously is an important reason that causes the browser to crash or become slower. When confronted with a multitude of processes or web pages, the user can not speed up the browser effectively. The difference between the embodiment of the invention and the prior art lies in that resource occupation situations of all processes to be optimized can be presented to the user, and the user can free system resources by performing the optimization processing to these processes correspondingly, to accelerate the running speed of the browser.

Embodiment Two

Figure 6:
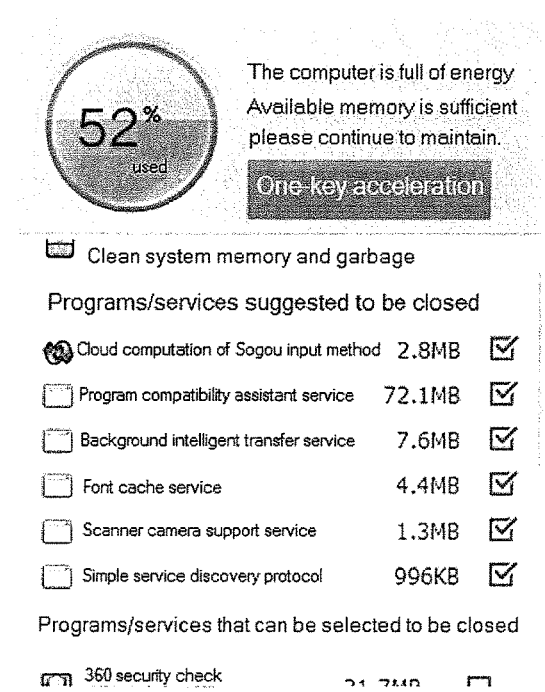
Figure 7:
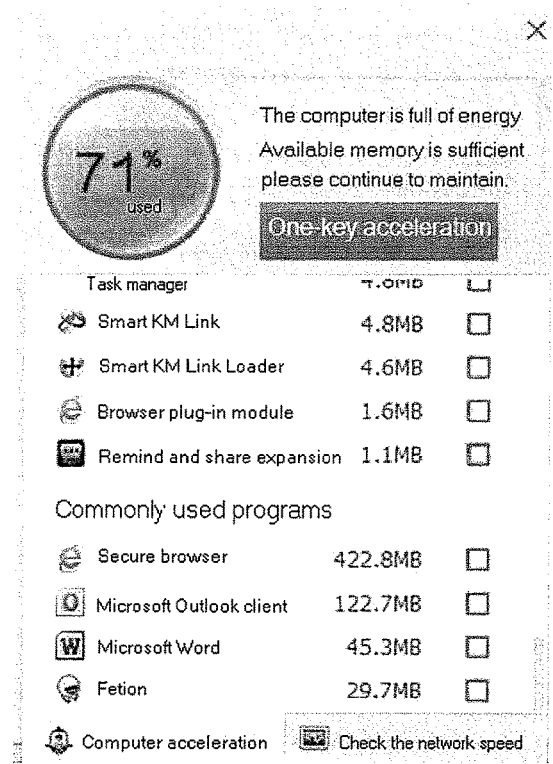

An embodiments of the invention further provides specific approaches adopted when the optimization processing is performed to a non-browser process in embodiment One. According to the above description, the optimization processing performed to a non-browser process is carried out by an optimization program. FIGS. 5-7 provide schematic diagrams of an interface in which an optimization program that applies the method of the invention to display non-browser processes. As shown in FIGS. 5-7, the interface primarily shows the user a list of processes including a plurality of processes, and in the list of processes, they are divided into the following several categories according to the characteristic of each process itself: the category of "optimizing system resources", the category of "programs/services suggested to be closed", the category of "programs/services that can be selected to be closed", and the category of "commonly used programs".

When a system optimization needs to be performed, corresponding optimization processing can be performed according to the characteristic of each category as shown in FIGS. 5-7. For instance, taking the category of "optimizing system resources" as an example, when performing the system optimization, mainly the two tasks of memory freeing and system speed optimization are accomplished by this category. Therein, the memory freeing is primarily realized by importing currently running processes from the physical memory into the virtual memory, and a specific importing procedure can be implemented by invoking an interface function (e.g., the interface function SetProcessWorkingSetSize) provided by the windows system. By importing the currently running processes from the physical memory into the virtual memory, a physical storage space can be freed and the memory occupancy rate can be lowered. The system speed optimization is primarily realized by reasonably setting system-related parameters. For example, as shown in FIG. 5, the optimization can be performed from the following several aspects when optimizing the system speed. Firstly, with respect to an aspect of system stability and system speed, the following optimization processing can be performed: 1) optimizing processor resource allocation: by reasonably configuring the processor resource, the user can obtain more resources such as CPU, memory, etc. when playing a game, and the delay is made smaller, which is very suitable for anti-terrorism games; 2) optimizing memory configuration: by reasonably configuring the memory, it can increase the disk buffering of a game program, improve the read/write speed, and accelerate the loading speed of a copy and a scenario; 3) optimizing the process response time: by reasonably setting the reaction time of a program, it can prevent a false death of a process when the process is closed, and cause the shutdown speed to be faster; 4) shortening the non-response wait time of a mouse and a keyboard: since the mouse and the keyboard can not be moved when a program crashes, the crash duration of the process can be shortened by shortening the non-response wait time of the mouse and the keyboard; 5) automatically closing a nonreactive process: when a process is detected to be crash, it is closed automatically, thereby improving the system stability; 6) closing a service: some services (e.g., the upgrade service, windows update) that occupy excessive system resources such as the memory, etc. are closed, such types of services are characterized by occupying too much memory when running, and the computer of the user will not be affected adversely after they are closed; 7) cleaning a useless dll file in the memory: a residual waste dll file or other temporary file is cleaned to improve the performance of the system. Secondly, with respect to the speed of the desktop, window and menu, the following optimization processing can be performed: 1) accelerating the display and response speed of each command in the system: the delay setting when clicking a software menu is reduced, which can the open speed of the software menu to be faster; 2) optimizing a user interface component: automatic refreshing is performed when an interface dies falsely or crashes, to enhance the system stability; 3) optimizing a process of a program: the start menu is let to have independent process priority processing, which can prevent the false death. By the abovementioned processing, the aim of optimizing system resources can be achieved, and thereby can reduce the resource occupancy rate, and increase the running speed of a browser of a user.

In addition, in order to enable the user to learn about the current resource occupancy rate of the system immediately to decide whether it is necessary to perform the optimization processing, the optimization program can calculate the current resource occupancy rate of the system in real time and display the calculated current resource occupancy rate in the form of a floating ball at a specified position (e.g., at the top left corner) of a list of processes as shown in FIGS. 5-7. The display color of the floating ball can be further changed with the resource occupancy rate. For example, when the resource occupancy rate is lower than a third threshold, the color of the floating ball is green, and the user is prompted by a text "available resources are sufficient, please continue to maintain" beside it. In order to facilitate the understanding of the user, a text "the computer is full of energy" can be further displayed to the user. When the resource occupancy rate is higher than a fourth threshold, the color of the floating ball is red, and the user is prompted by a text "available resources are insufficient, an optimization is suggested" beside it. In order to facilitate the understanding of the user, a text "the computer is a little tired" can be further displayed to the user. When the resource occupancy rate is between the third threshold and the fourth threshold, the color of the suspended ball is orange, and the user is prompted by a text "less resources are available" beside it. In order to facilitate the understanding of the user, a text "the computer can't run anymore" can be further displayed to the user. Further, the percentage of the current resource occupancy rate can also be displayed within the floating ball, to facilitate the user to accurately learn about the resource utilization situation. Therein, when setting the fourth threshold, it can be set according to the configuration of the computer. For example, for a computer with a high configuration, since the resources are sufficient, an occupation of 80% of the resources will not cause a too large impact, whereas for a computer with a low configuration, since the resources are not many, an occupation of 80% of the resources will cause a large impact. Therefore, the fourth threshold for a computer with a high configuration can be higher than that for a computer with a low configuration. Likewise, the third threshold can also be set flexibly according to the configuration of the computer.

In FIGS. 5-7, the resource represented by the floating ball is the memory resource, and prompting texts "available memory is sufficient, please continue to maintain" and "the computer is full of energy" are displayed beside the floating ball. This means that the current memory resource is sufficient, and at the moment, the color of the floating ball is displayed to be green. In a practical situation, the floating ball can also be used to represent the occupancy rate of certain other resource. When the floating ball represents the occupancy rate of certain other resource, the prompting texts displayed beside the floating ball will also be modified to be the name of the resource correspondingly. For example, when the floating ball represents the occupancy rate of the CPU resource, the text displayed beside the floating ball can be "available CPU is sufficient, please continue to maintain" or "the CPU occupation is too high, an optimization is suggested", and so on. In addition, a floating ball can also represent the occupancy rate of multiple resources simultaneously, to facilitate the user to comprehensively learn about the current resource utilization situation. When the floating ball represents the occupancy rate of multiple resources, each resource cab be allocated with a different weight according to its role in the performance optimization, and each resource is weighted according to its occupied weight, to obtain a weight which can synthetically reflect the synthetic occupancy rate of the multiple resources. This weight can be represented in the form of a score (e.g., a score between 0 and 100), or be represented in the form of a percentage. At this point, one floating ball can be used to display a specific numerical value of the weight, to facilitate the user to learn about the synthetic occupation situation of the multiple resources; or multiple floating balls can be used to represent the occupation situation of each category of resources respectively, to facilitate the user to intuitively learn about the current occupation situation of each category of resources.

Figure 8:
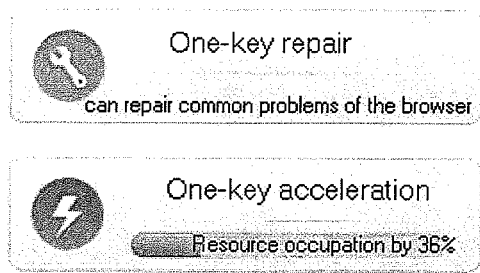
FIG. 8 schematically shows a schematic diagram of an optimization window according to an embodiment of the invention.

In addition, when the user opens the optimization program, the optimization program can further display an optimization window as shown in FIG. 8 to the user. In this window, the display state of a floating bar marked with "one-key acceleration" is consistent with the floating ball displayed on the list of processes, and the window can play the role of prompting the user. When the user clicks the words "one-key acceleration" on the window, the optimization program shows the user the list of processes as shown in FIGS. 5-7.

In addition to the implementation way of calculating the resource occupancy rate in real time introduced above, a button can be set separately, and when the user clicks the button, the resource occupancy rate is calculated and displayed, so as to save the calculation load and save the energy consumption.

In a case of a floating ball being set, when the suspended ball shows that the resource occupancy rate is too high (for example, the suspended ball is red), the processing of "optimizing system resources" can be performed by clicking a corresponding optimization button by the user, or the processing of "optimizing system resources" can be triggered automatically by the system. In addition, when the processing of "optimizing system resources" is triggered automatically by the system, it can be further performed in the manner of a regular system optimization.

Furthermore, after performing the processing of "optimizing system resources", prompting content can be further displayed to the user, and the prompting content can be a popup message or window, or prompting words displayed at a specified position of the list of processes. The prompting content is mainly used for displaying specific numbers of various resources saved by optimization to the user, to facilitate the user to learn about the effect of optimization.

In the category of "optimizing system resources", some conventional and comprehensive system cleaning works are primarily performed. Next, after introducing the category of "optimizing system resources", manners of processing the category of "programs/services suggested to be closed", the category of "programs/services that can be selected to be closed", and the category of "commonly used programs" involved in the system optimization method of the invention will be introduced emphatically. Therein, the category of "programs/services suggested to be closed" may also be called a first category, and the category of "programs/services that can be selected to be closed" and the category of "commonly used programs" may be collectively called a second category, wherein the category of "programs/services that can be selected to be closed" is taken as a second sub-category in the second category, and the category of "commonly used programs" is taken as a first sub-category in the second category.

When the user opens the optimization program, or when the user clicks the start button on the optimization program, it begins to execute the step S102 and the step S104 in the method provided by the invention to obtain process information of processes and their resource occupation information, and continues to execute the step S106 to judge whether the information states of both the process information of each process and its resource occupation information obtained in the step S102 and the step S104 meet the preset resource occupation optimization setting.

Next, in the step S108, non-browser processes that meet the preset resource occupation optimization setting are displayed in the first category (the category of "programs/services suggested to be closed" as shown in FIGS. 5-7) of the list of processes, and processes that do not meet the preset resource occupation optimization setting are displayed in the second category (the category of "programs/services that can be selected to be closed" and the category of "commonly used programs" as shown in FIGS. 5-7), wherein the states of the programs in the first category are checked by default, and the states of programs in the second category are unchecked by default.

Finally, in the step S110, the optimization processing is performed to at least a part of the processes that are displayed according to an optimization instruction triggered by the user. Therein, the optimization instruction is generally triggered by the user, for example, triggered by clicking the "one-key acceleration" button in FIGS. 5-7. Before the user triggers the optimization instruction, the state of each process in the list of processes in FIGS. 5-7 needs to be set. The state of a process comprises checked and unchecked. If the user agrees to check all of the processes in the first category and uncheck all of the processes in the second category, that is, he accepts the default states of the processes, then he may not perform any extra setting and directly click the "one-key acceleration" button to trigger the optimization instruction; if the user considers that a certain process in the first category should not be optimized, he may set the state of the process to be unchecked, and correspondingly, if the user considers that a certain process in the second category should be optimized, he may set the state of the process to be checked. Thus, the optimization instruction contains the state of each process in the list of processes, and when the optimization instruction is received, it may be possible to know the processes of which the states are checked in the list of processes, and perform the optimization processing thereon. When performing the optimization processing, the resource occupancy amount displayed in the floating ball descends first, then rises up, and finally stays at a resource occupancy amount after the optimization.

It needs to be noted that, when an object to which optimization processing is to be performed is a non-browser process, in addition to the above described processing operations, the optimization processing further comprises: 1) setting a CPU priority level for the non-browser process to be optimized, wherein the CPU priority level can be set for the non-browser process to be optimized according to its degree of importance, the CPU priority level of an important non-browser process is set to be high and the CPU priority level of an unimportant non-browser process is set to be low, thereby shortening the response time of an important process and reducing the wait time of the user; this approach can be primarily used for some processes that are not suitable for being closed directly; 2) switching the process to be optimized from multiple cores of a multi-core CPU into one core, wherein this approach can be primarily used for some crashed processes, to avoid that they occupy excessive CPU resource, they can be switched from multiple cores of a multi-core CPU into one core to avoid affecting other cores.

In addition, after executing the step S110, prompting content can be further displayed to the user. The prompting content can be a popup message or window as well, or also prompting words displayed at a specified position of the list of processes. The tip content is used for displaying specific numbers of various resources saved after optimization in the step S110 to the user, to facilitate the user to learn about the effect of the optimization.

Through the above ways, the optimization processing of a non-browser process can be realized, thereby increasing the running speed of the browser.

Additionally, it can be seen from FIGS. 5-7 that in the embodiment of the invention, processes in the second category are further sub-divided into the first sub-category (i.e., the category of "commonly used programs") and the second sub-category (i.e., the category of "programs/services that may be selected to be closed"). Therein, the first sub-category primarily shows some commonly used processes, for example, 360 secure browser, Microsoft word, fetion, etc.; the second sub-category displays the processes other than the first sub-category in the second category. To determine which processes belong to the first sub-category and which processes belong to the second sub-category in the second category, a list of commonly used processes needs to be set in advance, and in the list of commonly used processes, names of a variety of commonly used processes are stored. Accordingly, after the processes that do not meet the preset resource occupation optimization setting are displayed in the second category of the list of processes in the step S108, for a program in the second category, it is further judged whether it belongs to the preset list of commonly used processes; and if the judgment result is yes, it is displayed in the first sub-category, and if the judgment result is no, it is displayed in the second sub-category.

It has been introduced above that the states of the processes in the second category are unchecked by default, and therefore, in the first sub-category (i.e., the category of "commonly used programs"), the states of its processes are unchecked by default. However, for the second sub-category (i.e., the category of "programs/services that can be selected to be closed"), the situation is slightly different. Before the optimization instruction is received the first time, the states of the processes in the second sub-category are unchecked by default, which is the same as the first sub-category. However, if, before sending the optimization instruction for the first time, the user manually changes the states of some processes (e.g., the "AliPay control", the "AliPay detection program", etc. in FIGS. 5-7) in the second sub-category to be checked, that is, in the optimization instruction received for the first time, the processes in the second sub-category of which the states have been changed manually are in a checked state, then before the optimization instruction is received for the second time, the default states of the processes in the second sub-category of which the states have been changed manually still keep the checked state. Similarly, except that the states of the processes in the second sub-category are unchecked by default before the optimization instruction is received for the first time, before the optimization instruction is received subsequently, the states of the processes in the second sub-category are the same as those in the optimization instruction received last time by default. That is to say, the states of the processes in the second sub-category possess a memory function, and if, when executing the optimization instruction this time, the user optimizes some processes therein, then the default states of the optimized processes will be changed to be checked before the optimization instruction is to be executed the next time. The advantages of this lies in that, in general, if the user optimizes some processes this time, it means that the user considers it is necessary to optimize these processes, and therefore, in the next-time optimization, the user may still tend to optimize these processes, and hence the memory function of processed in the second sub-category can facilitate the user to remember his own last selection, thereby increasing the optimization efficiency. In addition, the reason why the commonly used processes are taken as a sub-category separately, and the processes in this sub-category are made not to have the memory function, and their default states at each time are made to be unchecked is primarily because that in general, a commonly used process does not need to be optimized, and if the user optimizes the commonly used process by accident, it will often affect the normal use of the process, and therefore, taking commonly used processes as a sub-category separately can prevent the user's misoperation.

In the specific approach for optimizing a non-browser process provided by the embodiment of the invention, by categorizing and displaying the non-browser processes which meet the preset resource occupation optimization setting, it is convenient for the user to decide to which programs the optimization processing should be performed according to the characteristics of the different categories. The embodiment of the invention can not only close some unnecessary processes, services and background programs, but also can free more memory, close processes which occupy too much network speed, and process processes with problems, processes that is unnecessarily running, and processes that occupy too much memory, thereby freeing more resources and accelerating the running speed of the browser.

Embodiment Three

Figure 9:
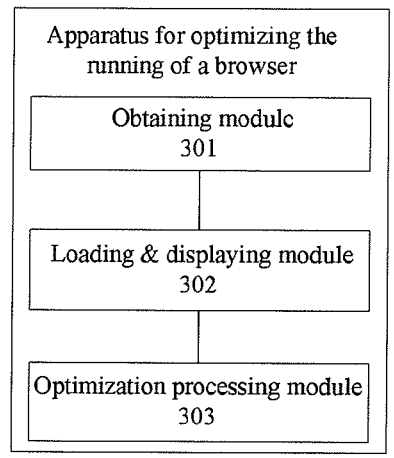
FIG. 9 schematically shows a block diagram of a first kind of apparatus for optimizing the running of a browser according to an embodiment of the invention.

FIG. 9 is a block diagram of a first apparatus for optimizing the running of a browser in an embodiment of the invention, which comprises:

an obtaining module 301 configured to obtain information of browser processes at the browser side and their first resource occupation information, wherein a specific obtaining procedure can be referred to the description in the step S102 and will not be repeated here, and to obtain information of currently running processes of a computer system where the browser is located and their second resource occupation information through a browser interface, wherein a specific obtaining procedure can be referred to the description in the step S104 and will not be repeated here;

a loading & displaying module 302, coupled with the obtaining module 301, configured to load and display information on at least a part of processes which meet a preset resource occupation optimization setting in the information of the browser processes and the information of the currently running processes of the computer system where the browser is located obtained by the obtaining module 301 and/or their resource occupation information at the browser side, wherein a specific displaying procedure of the loading & displaying module 302 can be referred to the description in the step S108 and will not be repeated here, It needs to be noted that, before displaying the information of the at least a part of the processes which meet the preset resource occupation optimization setting in the information of the currently running processes and/or their resource occupation information, the loading & displaying module 302 is further configured to judge whether the information states of both the process information of each process and its resource occupation information obtained by the obtaining module 301 meet the preset resource occupation optimization setting, a specific judgment way can be referred to the description in the step S106 and will not be repeated here; and an optimization processing module 303, coupled with the loading & displaying module 302, configured to, after the loading & displaying module 302 displays the information of the at least a part of the processes which meet the preset resource occupation optimization setting and/or their resource occupation information, perform process optimization processing to the displayed at least a part of the processes according to an optimization instruction triggered by a user, wherein, when the optimization processing module 303 performs the optimization processing to a browser process, it can be specifically referred to the optimization processing approach for a browser in the step S110 and will not be repeated here. When the optimization processing module 303 performs the optimization processing to a non-browser process, it can be referred to the optimization processing procedure for a browser process in embodiment Two and will not be repeated here.

Figure 10:
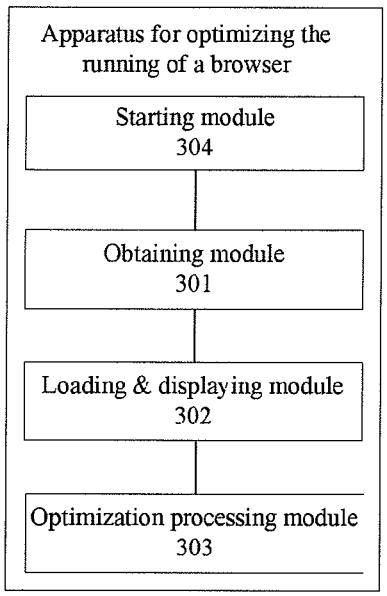
FIG. 10 schematically shows a block diagram of a second kind of apparatus for optimizing the running of a browser according to an embodiment of the invention.

Optionally, the apparatus further comprises a starting module 304, and for that, the embodiment of the invention further provides FIG. 10, which is used for showing a block diagram of a second apparatus for optimizing the running of a browser in an embodiment of the invention. Therein, the starting module 304 is coupled with the obtaining module 301 and configured to start a preset work thread of an optimization program at the browser side before the obtaining module 301 obtains the information of the browser processes and their first resource occupation information, wherein the preset work thread is configured to obtain the information of the browser processes at the browser side and the first resource occupation information and obtain the information of the currently running processes of the computer system where the browser is located and their second resource occupation information.

Optionally, the operation of obtaining the information of the browser processes at the browser side and their first resource occupation information performed by the obtaining module 301 can be implemented by the following steps:

the optimization program at the browser side sending a request for obtaining the first resource occupation information to the preset work thread;

the preset work thread sending a request for obtaining a request for obtaining the information of the browser processes to a preset plug-in process at the browser side;

the preset plug-in process obtaining the information of the browser processes by a browser main program communicating with an extension module of the optimization program at the browser side;

the preset plug-in process returning the information of the browser processes to the preset work thread; and the preset work thread obtaining the first resource occupation information by calculating according to the information of the browser processes.

Optionally, the operation of obtaining information of the currently running processes of a computer system where the browser is located and their second resource occupation information performed by the obtaining module 301 can be implemented by the following steps:

the preset work thread obtaining the information of the currently running processes of the computer system where the browser is located and their second resource occupation information through the browser interface.

Optionally, the starting module 304 is further configured to start the browser before starting the preset work thread of the optimization program at the browser side, wherein the browser main program and the optimization program of the browser are at least comprised when the browser is started.

Optionally, the information of the browser processes obtained by the obtaining module 301 at least comprises: information of a web page label sub-process or thread, information of a browser plug-in process, and information of a browser extension process.

Optionally, when the information of the browser processes is information of a web page label sub-process or thread, the information of the browser processes at least comprises one of the following items:

the identification number of the label or thread, the title of the label or thread, the address of the label or thread, the icon of the label or thread, a message of a browser sub-process where the label or thread is located, the CPU occupancy rate of the label or thread, the memory occupancy amount of the label or thread, and the occupancy level separately corresponding to the label or thread;

when the information of the browser processes is information of a plug-in process, the information of the browser processes at least comprises one of the following items:

the icon of the plug-in process, the name of the plug-in process, the bandwidth occupation of the plug-in process, the Fast Package Schedule FPS value of the plug-in process, the CPU occupancy rate of the plug-in process, the memory occupancy amount of the plug-in process, and the occupancy level separately corresponding to the plug-in process; and when the information of the browser processes is information of an extension process, the information of the browser processes at least comprises one of the following items:

the icon of the extension process, the name of the extension process, the bandwidth occupation of the extension process, the FPS value of the extension process, the CPU occupancy rate of the extension process, the memory occupancy amount of the extension process, and the occupancy level separately corresponding to the extension process.

Optionally, the information of the currently running processes of the computer system where the browser is located at least comprises one of the following items: the CPU occupancy rate of the process, the input/output port occupancy amount of the process, the memory occupancy amount of the process, the module description of the process, the network throughput, and the occupancy level separately corresponding to the process.

Optionally, the first resource occupation information obtained by the obtaining module 301 is obtained by calculating according to the CPU occupancy rate of the browser process and/or the memory occupancy amount of the browser process;

the second resource occupation information obtained by the obtaining module 301 is obtained by calculating according to at least one piece of the following information: the CPU occupancy rate, the memory occupancy amount, the input/output port occupancy amount, and the network throughput of the currently running process of the computer system where the browser is located.

Optionally, for the browser process, a judgment condition of the preset resource occupation optimization setting is as follows:

judging whether the numeric value of the first resource occupation information of the browser process exceeds a preset first threshold, and if it exceeds the first threshold, determining that the browser process meets the preset resource occupation optimization setting, wherein a way of evaluating the first threshold can be referred to the description of the specific way of evaluating the first threshold in the step S106 and will not be repeated here.

Optionally, for a currently running process of the computer system where the browser is located, the preset resource occupation optimization setting comprises a first optimization setting and a second optimization setting;

a judgment condition of the first optimization setting comprises one or more of the following:

judging whether the numeric value of the second resource occupation information of the currently running process of the computer system where the browser is located exceeds a preset second threshold, and if it exceeds the second threshold, determining that the currently running process of the computer system where the browser is located meets the first optimization setting, a way of evaluating the second threshold may be referred to the description of the specific way of evaluating the first threshold and will not be repeated here;

according to the information of the process, judging whether the currently running process of the computer system where the browser is located occurs in foreground running processes, and if it does not occur in the foreground running processes, determining that the currently running process of the computer system where the browser is located meets the first optimization setting, wherein the foreground running processes comprise a process shown on the taskbar and a process shown on a window;

according to the information on the process, judging whether the currently running process of the computer system where the browser is located meets a preset blacklist rule, and if yes, determining that the currently running process of the computer system where the browser is located meets the first optimization setting;

according to the information on the process, judging whether the currently running process of the computer system where the browser is located meets a preset running condition, and if not, determining that the currently running process of the computer system where the browser is located meets the first optimization setting; and a judgment condition of the second optimization setting is as follows:

when the currently running process of the computer system where the browser is located does not meet the first optimization setting, judging whether an abnormity occurs to the currently running process of the computer system where the browser is located, and if an abnormity occurs, determining that the process meets the second optimization setting, wherein the abnormity comprises a GDI (Graphics Device Interface) leakage, a window crash, and a CPU crash.

Optionally, when a foreground running process is a process shown on a window, the preset resource occupation optimization setting further comprises: when the using frequency of the process shown on the window is lower than a preset value, further judging whether the process is set top in the window, and if the judgment result is no, determining that the process meets the preset resource occupation optimization setting.

Optionally, the optimization processing performed by the optimization processing module 303 at least comprises: closing of a web page label sub-process or thread, closing of a browser extension process, closing of a browser plug-in process, closing of a currently running process and/or service of the computer system where the browser is located, freeing of the memory, and cleaning of system garbage;

when an object on which optimization processing is to be performed is a currently running process of the computer system where the browser is located, the optimization processing further comprises: setting the CPU priority level for the process to be optimized; and/or switching the process to be optimized from multiple cores of a multi-core CPU into one core.

The embodiment of the invention provides an apparatus for optimizing the running of a browser, which can obtain information of resources occupied by processes by obtaining information of browser processes and non-browser processes running locally. Subsequently, the obtained information of the resources is presented on an interface, which can facilitate a user to see the resource occupation of each process conveniently and intuitively and perform reasonable optimization processing to it.

In the prior art, a poor design of the script of a web page or excessive occupation of resources (CPU, memory, etc.) caused by too many processes being run simultaneously is an important reason that causes the browser to crash or become slower. When confronted with a multitude of processes or web pages, the user can not speed up the browser effectively. The difference between the embodiment of the invention and the prior art lies in that resource occupation situations of all processes to be optimized can be presented to the user, and the user can free system resources by performing the optimization processing to these processes correspondingly, to accelerate the running speed of the browser.

Embodiment Four

Figure 11:
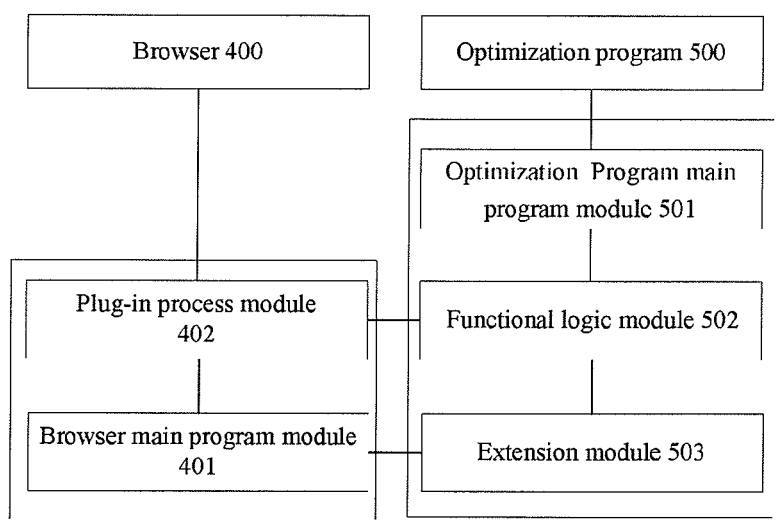
FIG. 11 schematically shows a block diagram of a system for optimizing the running of a browser according to an embodiment of the invention.

An embodiment of the invention further provides a system for optimizing the running of a browser. With reference to FIG. 11, the system specifically comprises a browser 400 and an optimization program 500.

Therein, the browser 400 comprises a browser main program module 401 and a plug-in process module 402.

The optimization program 500 comprises an optimization program main program module 501, an optimization program functional logic module 502 and an optimization program extension module 503.

In the system as shown in FIG. 11, the optimization program main program module 501 is configured as an interaction and presentation part between the user and the browser. The functional logic module 502 is configured to calculate the first resource occupation information and the second resource occupation information and communicate with the extension module 503. The extension module 503 is configured to obtain the information of the browser processes and close the browser process.

Figure 12:
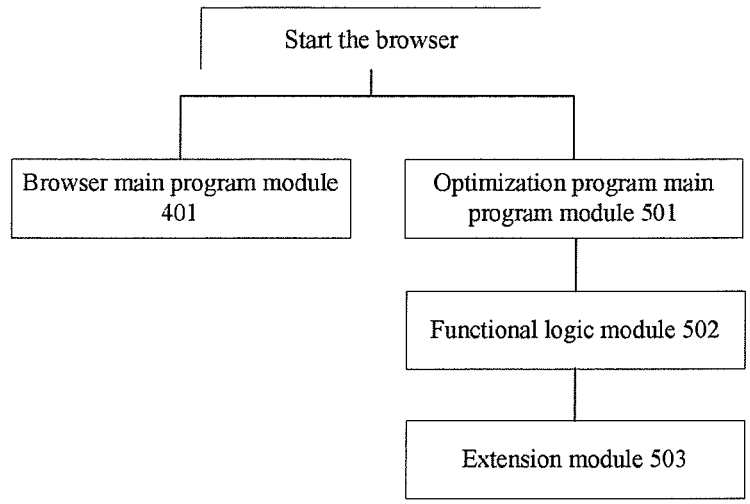
FIG. 12 schematically shows a principle diagram of starting an optimization program according to an embodiment of the invention.

In order to introduce the relationship between the browser and the optimization program in FIG. 11, an embodiment of the invention further provides FIG. 12, which is used for showing a principle diagram of starting the optimization program. As shown in FIG. 12, when the browser is started, the browser main program module 401 and the optimization program main program module 501 are started simultaneously. After the optimization program main program module 501 is started, the functional logic module 502 and the extension module 503 are started. Therein, when the browser is installed, it comes with the installation of the optimization program. Besides, the plug-in process module 402 is a module which is installed in the browser beforehand.

In the following, a principle diagram of the optimization program working when optimizing a process will be further described in connection with FIG. 13.

Figure 13:
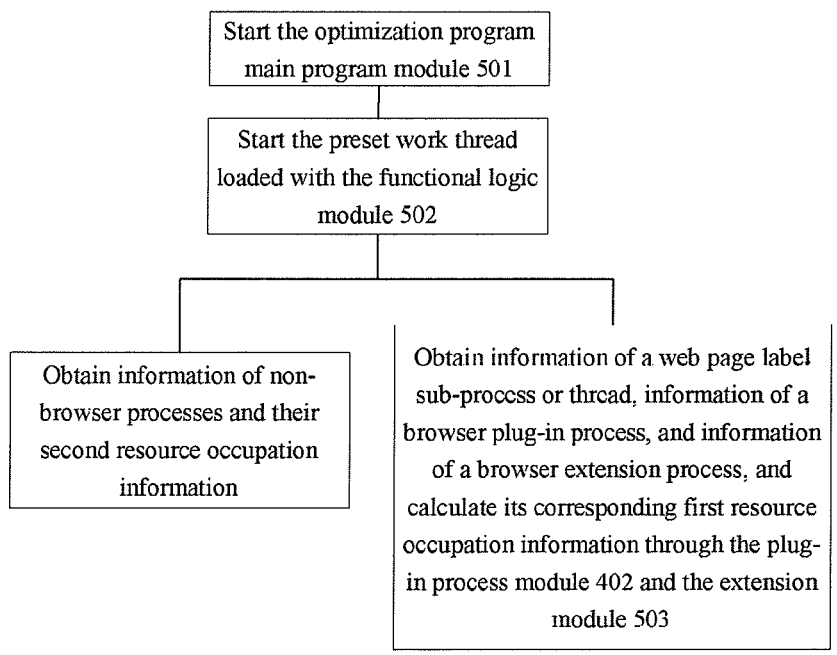
FIG. 13 schematically shows a principle diagram of an optimization program working according to an embodiment of the invention.

As shown in FIG. 13, after the user clicks the optimization program, the optimization program main program module 501 starts the preset work thread and loads the functional logic module 502.

The functional logic module 502 is configured to obtain the information of the browser processes at the browser side by the approach in the step S102, and calculate it to obtain the first resource occupation information. The functional logic module 502 is further configured to obtain the information of the non-browser processes at the non-browser side by the approach in the step S104, and calculate it to obtain the second resource occupation information.

The information of the browser processes at least comprises one kind of process information: information of a web page label sub-process or thread, information of a browser plug-in process, and information of a browser extension process.

Optionally, a way of obtaining the information of the browser processes at the browser side by the functional logic module 502 comprises the following specific procedure:

the optimization program main program module 501 sending a request for obtaining the first resource occupation information to the functional logic module 502;

the functional logic module 502 sending a request for obtaining the information of the browser processes to the plug-in process module 402;

the plug-in process module 402 obtaining the information of the browser processes by the browser main program module 401 communicating with an extension module 503;

the plug-in process module 402 returning the information of the browser processes to the functional logic module 502; and the functional logic module 502 obtaining the first resource occupation information by calculating according to the information on the browser process.

The optimization program main program module 501 is configured to display the information of the processes which meet the preset resource occupation optimization setting and/or their resource occupation information obtained by the functional logic module 502 at the browser side, which can be specifically referred to the description of the step S108 and will not be repeated here.

The extension module 503 is configured to perform the corresponding optimization processing to the process displayed by the optimization program main program module 501 that needs to be optimized.

The embodiment of the invention provides a system for optimizing the running of a browser, which can obtain information of resources occupied by processes by obtaining information of browser processes and a non-browser processes running locally. Subsequently, the obtained information of the resources is presented on an interface, which can facilitate a user to see the resource occupation of each process conveniently and intuitively and perform reasonable optimization processing to it.

In the prior art, a poor design of the script of a web page or excessive occupation of resources (CPU, memory, etc.) caused by too many processes being run simultaneously is an important reason that causes the browser to crash or become slower. When confronted with a multitude of processes or web pages, the user can not speed up the browser effectively. The difference between embodiments of the invention and the prior art lies in that resource occupation situations of all processes to be optimized can be presented to the user, and the user can free system resources by performing the optimization processing to these processes correspondingly, to accelerate the running speed of the browser.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein comprise some features and not other features comprised in other embodiment, a combination of features of different embodiments is indicative of being within the scope of the invention and forming a different embodiment. For example, in the following claims, any one of the claimed embodiments may be used in any combination.

Embodiments of the individual components of the invention may be implemented in hardware, or in a software module running on one or more processors, or in a combination thereof. It will be appreciated by those skilled in the art that, in practice, some or all of the functions of some or all of the components in an apparatus for optimizing the running of a browser according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 14:
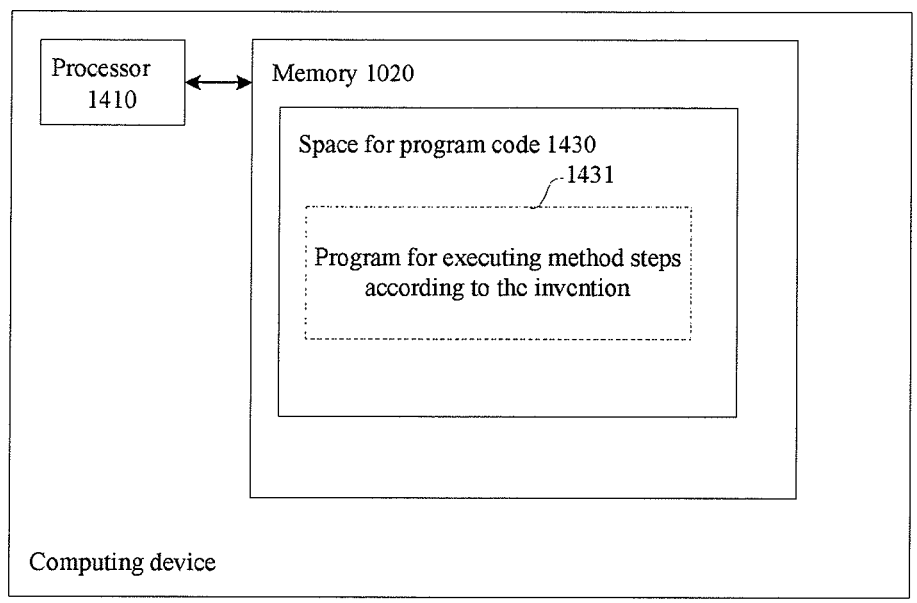
FIG. 14 schematically shows a block diagram of a computing device for performing a method for optimizing the running of a browser according to the invention.
Figure 15:
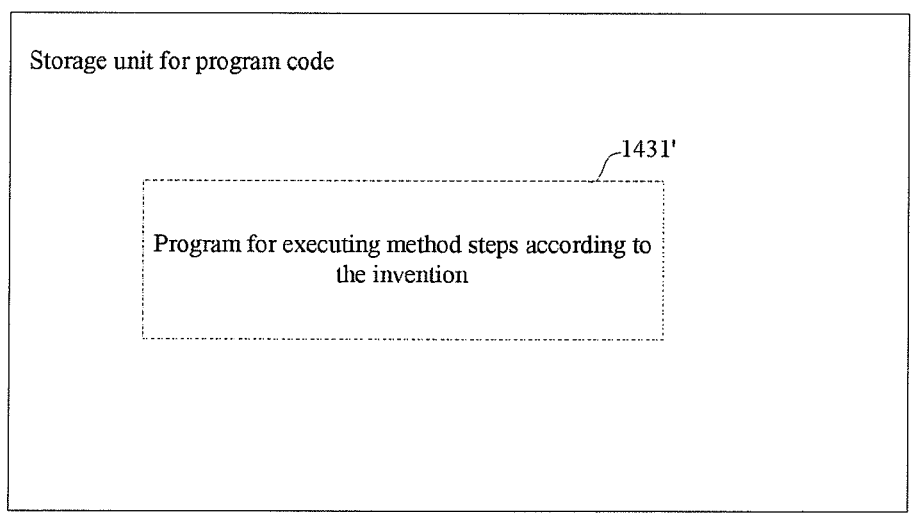
FIG. 15 schematically shows a storage unit for retaining or carrying a program code implementing a method for optimizing the running of a browser according to the invention.

For example, FIG. 14 shows a computing device which may carry out a method for optimizing the running of a browser according to the invention. The computing device traditionally comprises a processor 1410 and a computer program product or a computer readable medium in the form of a memory 1420. The memory 1420 may be an electronic memory such as a flash memory, an EEPROM (electrically erasable programmable read-only memory), an EPROM, a hard disk or a ROM. The memory 1420 has a memory space 1430 for a program code 1431 for carrying out any method steps in the methods as described above. For example, the memory space 1430 for a program code may comprise individual program codes 1431 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 15. The storage unit may have a memory segment, a memory space, etc. arranged similarly to the memory 1420 in the computing device of FIG. 14. The program code may for example be compressed in an appropriate form. In general, the storage unit comprises a computer readable code 1431', i.e., a code which may be read by e.g., a processor such as 1410, and when run by a computing device, the codes cause the computing device to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several apparatuses, several of the apparatuses may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A method for optimizing running of a browser on a computer system comprising:
   obtaining information of browser processes of the browser and first resource occupation information of the browser processes;
   obtaining, through a browser interface, information of running non-browser processes of the computer system running the browser and second resource occupation information of the running non-browser processes;
   loading and displaying the information and/or the first resource occupation information of at least one of the browser processes which meet a preset resource occupation optimization setting for the browser processes, loading and displaying the information and/or the second resource occupation information of at least one of the running non-browser processes which meet a preset resource occupation optimization setting for the running non-browser processes, not displaying the information and/or the first resource occupation information of the browser processes which do not meet the preset resource occupation optimization setting for the browser processes, and not displaying the information and/or the second resource occupation information of the running non-browser processes which do not meet the preset resource occupation optimization setting for the running non-browser processes;
   wherein the resource occupation optimization setting for the browser processes and the resource occupation optimization setting for the running non-browser processes are different;
   wherein the preset resource occupation optimization setting for the running non-browser processes comprises a first optimization setting;
   wherein the loading and displaying further comprises:
      in response to determining that the information and/or the second resource occupation information related to a first process of the running non-browser processes meets the first optimization setting, determining that the first process meets the preset resource occupation optimization setting for the running non-browser processes, comprising:
         based on the information of the first process, determining whether a second process that the first process of the running non-browser processes depends upon is running; and
         based on determining that the second process is not running, determining that the first process meets the first optimization setting; and
   according to an optimization instruction triggered by a user, performing process optimization processing to the at least one of the browser processes and the at least one of the running non-browser processes, wherein the at least one of the browser processes meets the preset resource occupation optimization setting for the browser processes, wherein the at least one of the running non-browser processes meets the preset resource occupation optimization setting for the running non-browser processes, wherein performing the optimization processing on the at least one of the running non-browser processes comprising:
      setting a CPU priority level for the at least one of the running non-browser process, wherein the CPU priority level is set for the at least one of the running non-browser process to be optimized according to its degree of importance, wherein the CPU priority level of an important running non-browser process is set to be high and the CPU priority of an unimportant running non-browser process is set to be low; and/or
      switching the at least one of the running non-browser processes to be optimized from multiple cores of a multi-core CPU into one core.

2. The method as claimed in claim 1, wherein before the obtaining the information of the browser processes and the first resource occupation information of the browser processes, the method further comprising:
   starting a preset work thread of an optimization program, wherein the preset work thread is configured to obtain: the information of the browser processes, the first resource occupation information, the information of the running non-browser processes of the computer system where the browser is located, and the second resource occupation information.

3. The method as in claim 2, wherein obtaining the information of the browser processes and the first resource occupation information comprises:
   sending, by the optimization program, a request for obtaining the first resource occupation information to the preset work thread;
   sending, by the preset work thread, a request for obtaining the information of the browser processes to a preset plug-in process;

obtaining, by the preset plug-in process, the information of the browser processes by a browser main program communicating with an extension module of the optimization program;

returning, by the preset plug-in process, the information of the browser processes to the preset work thread; and obtaining, by the preset work thread, the first resource occupation information by calculating according to the information of the browser processes.

4. The method as claimed in claim 1, wherein the information of the browser processes at least comprises: information of a web page label sub-process or thread, information of a browser plug-in process, and information of a browser extension process.

5. The method as claimed in claim 4, wherein when the information of the browser processes is information of the web page label sub-process or thread, the information of the browser processes comprises at least one of: an identification number of a label or thread, a title of the label or thread, an address of the label or thread, an icon of the label or thread, a message of a browser sub-process where the label or thread is located, a Central Processing Unit CPU occupancy rate of the label or thread, a memory occupancy amount of the label or thread, and an occupancy level separately corresponding to the label or thread;

when the information of the browser processes is information of a plug-in process, the information of the browser processes comprises at least one of: an icon of the plug-in process, a name of the plug-in process, bandwidth occupation of the plug-in process, a Fast Package Schedule (FPS) value of the plug-in process, a CPU occupancy rate of the plug-in process, a memory occupancy amount of the plug-in process, and an occupancy level separately corresponding to the plug-in process; and when the information of the browser processes is information of an extension process, the information of the browser processes comprises at least one of: an icon of the extension process, a name of the extension process, bandwidth occupation of the extension process, a FPS value of the extension process, a CPU occupancy rate of the extension process, a memory occupancy amount of the extension process, and an occupancy level separately corresponding to the extension process.

6. The method as claimed in claim 1, wherein the information of the running non-browser processes of the computer system where the browser is located comprises at least one of: a CPU occupancy rate of the running non-browser processes, a input/output port occupancy amount of the running non-browser processes, a memory occupancy amount of the running non-browser processes, a module description of the running non-browser processes, a network throughput, and an occupancy level separately corresponding to the running non-browser processes.

7. The method as claimed in claim 6, wherein the first resource occupation information is obtained by calculating according to the CPU occupancy rate of the browser processes and/or the memory occupancy amount of the browser processes;

the second resource occupation information is obtained by calculating according to at least one of: the CPU occupancy rate, the memory occupancy amount, the input/output port occupancy amount, and the network throughput of the running non-browser processes of the computer system where the browser is located.

8. The method as in claim 1, wherein a judgment condition of the preset resource occupation optimization setting for the browser processes comprises:

determining whether a numeric value of the first resource occupation information of the browser processes exceeds a preset first threshold; and based on determining that the numeric value exceeds the preset first threshold, determining that the browser processes meet the preset resource occupation optimization setting.

9. The method as in claim 1, wherein the preset resource occupation optimization setting for the running non-browser processes further comprises a second optimization setting, wherein the loading and displaying further comprises: in response to determining that a second process of the running non-browser processes meets the first optimization setting or the second optimization setting, determining that the second process meets the preset resource occupation optimization setting for the running non-browser processes;

wherein the first optimization setting further comprises one or more of the following:
determining whether a numeric value of the second resource occupation information of the running non-browser processes of the computer system where the browser is located exceeds a preset second threshold, and in response to determining that the numeric value exceeds the second threshold, determining that the running non-browser processes of the computer system where the browser is located meet the first optimization setting;

according to the information on the running non-browser processes, determining whether the running non-browser processes of the computer system where the browser is located meet a preset blacklist rule, and in response to determining that the running non-browser processes meet a preset blacklist rule, determining that the running non-browser processes of the computer system where the browser is located meet the first optimization setting;

according to the information on the running non-browser processes, determining whether the running non-browser processes of the computer system where the browser is located meet a preset running condition, and in response to determining that the running non-browser processes does not meet the preset running condition, determining that the running non-browser processes of the computer system where the browser is located meet the first optimization setting; and wherein the second optimization setting further comprises:
when the running non-browser processes of the computer system where the browser is located do not meet the first optimization setting, determining whether an abnormity occurs to the running non-browser processes of the computer system where the browser is located, and based on determining that the abnormity occurs, determining that the running non-browser processes meet the second optimization setting, wherein the abnormity comprises at least one of a Graphics Device Interface (GDI) leakage, a window crash, or a CPU crash.

10. The method as claimed in claim 1, wherein based on the foreground running processes showing on the window, the preset resource occupation optimization setting for the running non-browser processes further comprises:

in response to determining that the using frequency of the process shown on the window is lower than a preset value, determining whether the process is set top in the window; and based on determining that the process is not set top in the window, determining that the process meets the preset resource occupation optimization setting for the running non-browser processes.

11. An apparatus for optimizing running of a browser on a computer system comprising:
a memory having instructions stored thereon;
a processor configured to execute the instructions to perform operations for optimizing the running of a browser, the memory and the instructions configured to, with the processor, cause the apparatus to perform at least:
obtaining information of browser processes of the browser and first resource occupation information of the browser processes;
obtaining, through a browser interface, information of running non-browser processes of the computer system running the browser and second resource occupation information of the running non-browser processes;
loading and displaying the information and/or the first resource occupation information of at least one of the browser processes which meet a preset resource occupation optimization setting for the browser processes, loading and displaying the information and/or the second resource occupation information of at least one of the running non-browser processes which meet a preset resource occupation optimization setting for the running non-browser processes, not displaying the information and/or the first resource occupation information of the browser processes which do not meet the preset resource occupation optimization setting for the browser processes, and not displaying the information and/or the second resource occupation information of the running non-browser processes which do not meet the preset resource occupation optimization setting for the running non-browser processes;
wherein the resource occupation optimization setting for the browser processes and the resource occupation optimization setting for the running non-browser processes are different;
wherein the preset resource occupation optimization setting for the running non-browser processes comprises a first optimization setting;
wherein the loading and displaying further comprises:
in response to determining that the information and/or the second resource occupation information related to a first process of the running non-browser processes meets the first optimization setting, determining that the first process meets the preset resource occupation optimization setting for the running non-browser processes, comprising:
based on the information of the first process, determining whether a second process that the first process of the running non-browser processes depends upon is running; and
based on determining that the second process is not running, determining that the first process meets the first optimization setting; and
according to an optimization instruction triggered by a user, performing process optimization processing to the at least one of the browser processes and the at least one of the running non-browser processes, wherein the at least one of the browser processes meets the preset resource occupation optimization setting for the browser processes, wherein the at least one of the running non-browser processes meets the preset resource occupation optimization setting for the running non-browser processes, wherein performing the optimization processing on the at least one of the running non-browser processes comprising:
setting a CPU priority level for the at least one of the running non-browser process, wherein the CPU priority level is set for the at least one of the running non-browser process to be optimized according to its degree of importance, wherein the CPU priority level of an important running non-browser process is set to be high and the CPU priority of an unimportant running non-browser process is set to be low; and/or
switching the at least one of the running non-browser processes to be optimized from multiple cores of a multi-core CPU into one core.

12. The apparatus as in claim 11, wherein before the obtaining the information of the browser processes and the first resource occupation information of the browser processes, the memory and the instructions configured to, with the processor, cause the apparatus to:
starting a preset work thread of an optimization program, wherein the preset work thread is configured to obtain the information of the browser processes, the first resource occupation information, the information of the running non-browser processes of the computer system where the browser is located, and the second resource occupation information.

13. The apparatus as in claim 12, wherein obtaining the information of the running non-browser processes of the computer system where the browser is located and the second resource occupation information of the other running process comprises:
obtaining, by the preset work threat, the information of the running non-browser processes of the computer system where the browser is located and the second resource occupation information of the running non-browser processes through the browser interface.

14. The apparatus as claimed in claim 11, wherein the information of the browser processes at least comprises: information of a web page label sub-process or thread, information of a browser plug-in process, and information of a browser extension process.

15. The apparatus as claimed in claim 14, wherein when the information of the browser processes is information of the web page label sub-process or thread, the information of the browser processes comprises at least one of:
an identification number of a label or thread, a title of the label or thread, an address of the label or thread, an icon of the label or thread, a message of a browser sub-process where the label or thread is located, a Central Processing Unit CPU occupancy rate of the label or thread, a memory occupancy amount of the label or thread, and an occupancy level separately corresponding to the label or thread;
when the information of the browser processes is information of a plug-in process, the information of the browser processes comprises at least one of: an icon of the plug-in process, a name of the plug-in process, bandwidth occupation of the plug-in process, a Fast Package Schedule (FPS) value of the plug-in process, a CPU occupancy rate of the plug-in process, a memory occupancy amount of the plug-in process, and an occupancy level separately corresponding to each plug-in process; and when the information of the browser processes is information of an extension process, the information of the browser processes comprises at least one of: an icon of the extension process, a name of the extension process, bandwidth occupation of the extension process, a FPS value of the extension process, a CPU occupancy rate of the extension process, a memory occupancy amount of the extension process, and an occupancy level separately corresponding to the extension process.

16. The apparatus as claimed in claim 11, wherein the information of running non-browser processes of the computer system where the browser is located comprises at least one of: a CPU occupancy rate of the running non-browser processes, a input/output port occupancy amount of the running non-browser processes, a memory occupancy amount of the running non-browser processes, a module description of the running non-browser processes, a network throughput, and an occupancy level separately corresponding to the running non-browser processes.

17. The apparatus as claimed in claim 16, wherein the first resource occupation information is obtained by calculating according to the CPU occupancy rate of the browser processes and/or the memory occupancy amount of the browser processes;
the second resource occupation information is abstained by calculating according to at least one of: the CPU occupancy rate, the memory occupancy amount, the input/output port occupancy amount, and the network throughput of the running non-browser processes of the computer system where the browser is located.

18. The apparatus as claimed in claim 11, wherein a judgment condition of the preset resource occupation optimization setting for the browser processes comprises:
determining whether a numeric value of the first resource occupation information of the browser processes exceeds a preset first threshold; and
based on determining that the numeric value exceeds the preset first threshold, determining that the browser processes meet the preset resource occupation optimization setting.

19. The apparatus as claimed in claim 11, wherein the preset resource occupation optimization setting for the running non-browser processes further comprises a second optimization setting, wherein the loading and displaying further comprises: in response to determining that a second process of the running non-browser processes meets the first optimization setting or the second optimization setting, determining that the second process meets the preset resource occupation optimization setting for the running non-browser processes;
wherein the first optimization setting further comprises one or more of the following:
determining whether a numeric value of the second resource occupation information of the running non-browser processes of the computer system where the browser is located exceeds a preset second threshold, and in response to determining that the numeric value exceeds the second threshold, determining that the running non-browser processes of the computer system where the browser is located meet the first optimization setting;
according to the information on the running non-browser processes, determining whether the running non-browser processes of the computer system where the browser is located meet a preset blacklist rule, and in response to determining that the running non-browser processes meet a preset blacklist rule, determining that the running non-browser processes of the computer system where the browser is located meet the first optimization setting;
according to the information on the running non-browser processes, determining whether the running non-browser processes of the computer system where the browser is located meet a preset running condition, and in response to determining that the running non-browser processes does not meet the preset running condition, determining that the running non-browser processes of the computer system where the browser is located meet the first optimization setting; and
wherein the second optimization setting further comprises:
when the running non-browser processes of the computer system where the browser is located do not meet the first optimization setting, determining whether an abnormity occurs to the running non-browser processes of the computer system where the browser is located, and based on determining that the abnormity occurs, determining that the running non-browser processes meet the second optimization setting, wherein the abnormity comprises a Graphics Device Interface GDI leakage, a window crash, or a CPU crash.

20. A non-transitory computer readable medium having instructions stored thereon that, when executed by at least one processor, cause the at least one processor to perform operations for optimizing running of a browser on a computer system comprising:
obtaining information of browser processes of the browser and first resource occupation information of the browser processes;
obtaining, through a browser interface, information of running non-browser processes of the computer system running the browser and second resource occupation information of the running non-browser processes;
loading and displaying the information and/or the first resource occupation information of at least one of the browser processes which meet a preset resource occupation optimization setting for the browser processes, loading and displaying the information and/or the second resource occupation information of at least one of the running non-browser processes which meet a preset resource occupation optimization setting for the running non-browser processes, not displaying the information and/or the first resource occupation information of the browser processes which do not meet the preset resource occupation optimization setting for the browser processes, and not displaying the information and/or the second resource occupation information of the running non-browser processes which do not meet the preset resource occupation optimization setting for the running non-browser processes;
wherein the resource occupation optimization setting for the browser processes and the resource occupation optimization setting for the running non-browser processes are different;
wherein the preset resource occupation optimization setting for the running non-browser processes comprises a first optimization setting;
wherein the loading and displaying further comprises:
in response to determining that the information and/or the second resource occupation information related to a first process of the running non-browser processes meets the first optimization setting, determining that the first process meets the preset resource occupation optimization setting for the running non-browser processes, comprising:
    based on the information of the first process, determining whether a second process that the first process of the running non-browser processes depends upon is running; and
    based on determining that the second process is not running, determining that the first process meets the first optimization setting; and
according to an optimization instruction triggered by a user, performing process optimization processing to the at least one of the browser processes and the at least one of the running non-browser processes, wherein the at least one of the browser processes meets the preset resource occupation optimization setting for the browser processes, wherein the at least one of the running non-browser processes meets the preset resource occupation optimization setting for the running non-browser processes, wherein performing the optimization processing on the at least one of the running non-browser processes comprising:
setting a CPU priority level for the at least one of the running non-browser process, wherein the CPU priority level is set for the at least one of the running non-browser process to be optimized according to its degree of importance, wherein the CPU priority level of an important running non-browser process is set to be high and the CPU priority of an unimportant running non-browser process is set to be low; and/or switching the at least one of the running non-browser processes to be optimized from multiple cores of a multi-core CPU into one core.

* * * * *